Nov. 29, 1927.
G. A. LYON
1,650,635
AUTOMOBILE BUFFER CONSTRUCTION
Original Filed April 14, 1923    2 Sheets-Sheet 1
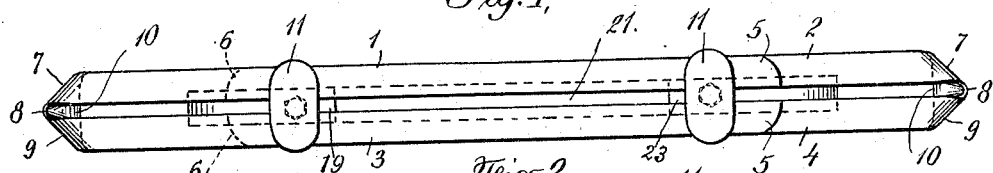
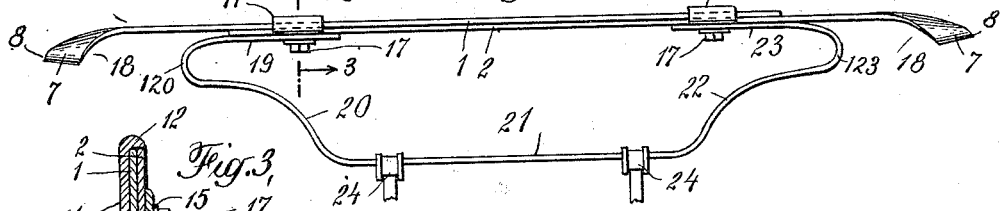
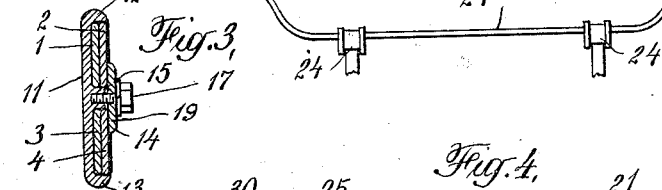
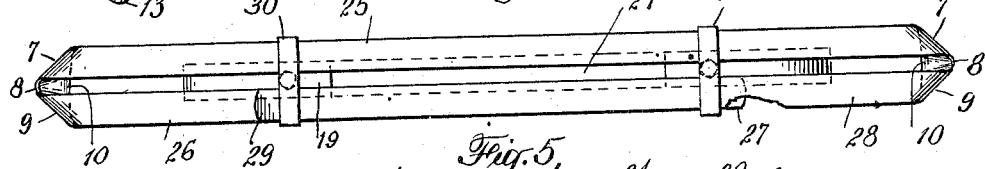
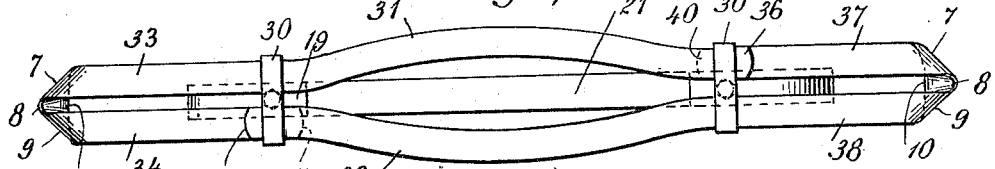
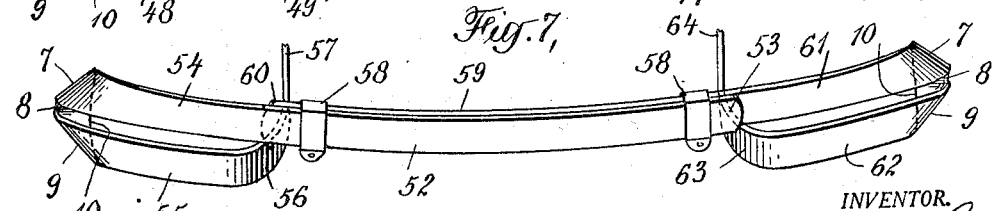
INVENTOR.
George Albert Lyon
BY
Harry L. Duncan
ATTORNEY.

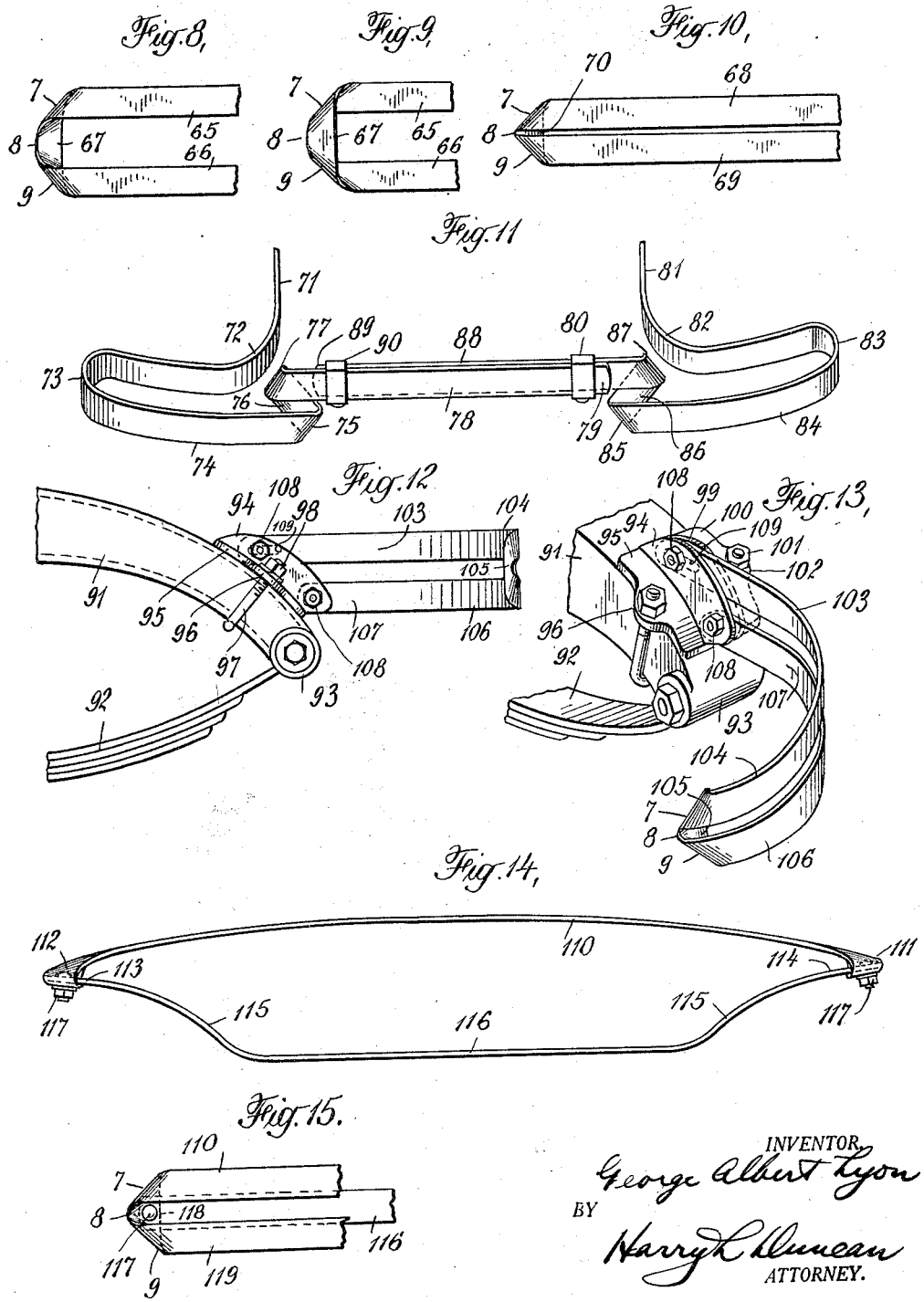

Patented Nov. 29, 1927.

1,650,635

UNITED STATES PATENT OFFICE.

GEORGE ALBERT LYON, OF ALLENHURST, NEW JERSEY.

AUTOMOBILE BUFFER CONSTRUCTION.

Application filed April 14, 1923, Serial No. 632,076. Renewed April 22, 1927.

This invention relates to automobile buffers or bumpers in which one or more of the buffer front elements may advantageously be formed of relatively wide thin strip such as spring steel one and three-quarters to two and a half inches wide and one-quarter to three-eighths of an inch thick more or less, which may be diagonally folded to form a transversely extending connector portion and several integrally connected transversely separated strip members extending in the same or opposite directions therefrom. Such a buffer element may be advantageously used at the lateral ends of the buffer adjacent the automobile wheels and in such cases the transverse connector portion may have its diagonal folds arranged at substantially right angles to each other so that two transversely separated strips extend horizontally inward from this connector portion to form a double height or double strip buffer element which may extend inward to or past the center of the buffer, if desired, and be adjustably or otherwise joined in overlapping reenforcing position with similar horizontal strip members which are joined by a transverse diagonally folded connector portion at the other side or end of the buffer. Such a buffer front may be supported in any desired way and a spring steel strip supporting attaching member may be arranged to be connected to the two frame ends and have forwardly extending connecting portions secured to these buffer front strip members on each side of the center of the buffer front and within a foot or so of the buffer ends so that these transverse connector portions at the buffer ends are not subjected to excessive strains which are largely transferred from each of the front strips directly to the connected buffer supporting member which is considerably wider than the vertical separation between the front strips. Under these conditions the diagonally folded transverse connector portions which may be provided at one or both ends of the buffer front may be folded rather closely together at their diagonally bent portions and, if desired, this diagonal connector portion may be folded substantially parallel to the adjacent portions of the vertically separated buffer front strips which may of course be thus connected in vertically aligned position and at any desired distance apart such as two to six inches more or less between their adjacent edges. These double strip buffer elements may be readily finished since the substantially parallel or horizontally extending front strip members may be ground, polished and nickel plated, if desired, while the rearwardly extending transverse connector portion may be finished in baked enamel or other suitable material of less prominent appearance so that the rectangularly arranged folded edges which are rounded over at the buffer ends give a striking appearance to this type of construction. Generally similar buffer elements having transversely separated strip members connected by integral diagonally folded transverse connector portions may of course be used in other parts of the automobile buffers with advantage and buffer supporting members may be formed in this way and connected in any suitable way to the car frame and of course by arranging this substantially transverse angularly folded connector portion so that the transversely separated strips project therefrom in opposite directions, the diagonal folds at the ends of the connector portion may be more or less parallel, this construction being useful in providing vertically separated portions of the buffer front which may serve as impact receiving members, if desired. Buffer fronts may be made up of two adjustably connected elements having transversely extending end connector portions joined by these diagonal folds with the transversely separated buffer front strips or, if desired, a single strip may have such diagonally folded transverse connector portions at both ends and may have the strip ends welded or otherwise secured together so as to form, if desired, an overlapping reenforcing portion on the upper or lower front strip adjacent the buffer center between the clamping connecting devices which may be used to connect these front strips to the cooperating supporting members used. Also, if desired, a unitary double height buffer front may be made up in this way so as to be somewhat shorter than the width of the buffer laterally across the vehicle, and this double strip front member may be connected in any suitable way to a single height strip buffer front of the Lyon type construction, for instance, so as to form a central impact receiving portion of increased vertical width in some cases. While of course it is sometimes desirable to have the buffer front strips substantially aligned with each other transversely adjacent the transversely extending diagonally folded connector portion integrally joining them, yet for some purposes this folded connection may be arranged so that the adjacent portions of the strip members are arranged at an angle to each other so that instead of being vertically or transversely aligned throughout they may be either convexly or concavely curved in cross section or each oppositely inclined and arranged at an angle of ten to twenty degrees more or less from the vertical line parallel to the transverse connector portion so as to form a generally convex or concave arrangement of the strips, which gives them additional stiffness and strength where desired.

In the accompanying drawing showing in a somewhat diagrammatic way various illustrative embodiments of this invention Fig. 1 is a front view of an illustrative buffer Fig. 2 is a top view thereof, and Fig. 3 is a transverse section taken substantially through the line 3—3 of Fig. 2.

Figs. 4, 5 and 6 are front views showing other illustrative constructions

Fig. 7 is a perspective view showing still another form

Figs. 8, 9 and 10 show different forms of double strip elements connected by such diagonally folded end connector portions Fig. 11 is a perspective view showing still another form of buffer Fig. 12 is a side view showing a buffer element and mounting Fig. 13 is a perspective view thereof Fig. 14 is a top view showing still another form of buffer, and Fig. 15 is a front detail view of the connection.

In the illustrative buffer shown in Figs. 1 to 3 the buffer front may be formed of two elements of relatively wide thin spring steel strip. One of these elements may comprise the vertically or transversely separated front strips 1 and 3, connected at the buffer end by a transversely extending diagonally folded connector portion 10 which has its folded edges 7 and 9 substantially rectangularly arranged. This diagonally folded transverse connection 18 may, as shown in Fig. 2, have its outer end 8 at the end of the buffer which may of course project into protective position adjacent the automobile wheels and the rearwardly extending connector portion 10 may project further away from the front strips at its inner edge as shown in Fig. 1, which is of course largely concealed from view when the buffer is mounted on the car. A similar double height buffer front element may comprise the vertically separated front strip members, 2, 4 having a similar diagonally folded transversely or vertically extending connector portion 10 on the opposite end of the buffer and these vertically separated front strip members may be arranged in substantial vertical alignment with each other and may be long enough to overlap throughout a considerable distance adjacent the buffer front between the ends 5, 6 of the corresponding vertically separated front strips, as shown in Fig. 1, so as to form overlapping mutually reenforcing impact receiving members which may be connected and supported from the vehicle in any suitable way. As shown in Fig. 2, a supporting attaching member may be formed of spring steel strip having a brace bar attaching portion 21 extending across the frame ends 24 to which it may be clamped or connected in any suitable way. Forwardly extending portions such as 20, 22 may be formed in this strip which may have the bends 120, 123 where greater resilient yield is desired, while the inturned connecting portions 19, 23 which may support and, if desired, contact with both the upper and lower sets of buffer front strips, to which they may be secured by any suitable connecting or clamping devices. For this purpose the recessed clamps 11 may be employed which may have the projecting ends 12, 13 extending more or less around these front strips, while a clamping bolt 17 threaded into the clamp member may securely hold the connecting portion such as 19 of the supporting member thereto as well as clamping the front strips 1, 2 and 3, 4 together in laterally adjusted position so as to make the buffer of the lateral length desired; a lock washer such as 15 may advantageously be provided beneath the bolt 17 to prevent loosening of the parts. As shown in Fig. 3, the supporting member may be formed of steel strip having at each end a quarter turned curved edge 14 so as to have a relatively large area of contact with the front strips while on the rear portions 20, 21 and 22, these curved edges are visible from the front so as to give a more desirable and finished appearance. Of course the buffer front strips may be given any desired form and may either extend substantially straight across the buffer front as shown in Fig. 2, with rearwardly curving end portions or, if desired, the buffer front may be forwardly arched or curved in some cases and it is of course understood that these strip members may be formed of suitable spring steel stock and may be hardened and tempered to give greater strength and resilient cushioning action under collision conditions.

Fig. 4 shows another arrangement in which the buffer front may be formed of a single strip of spring steel having diagonally folded transversely extending integral connector portions at both ends of the buffer front so as to support the transversely or vertically separated front strips at the desired distance apart at each end of the buffer. This front strip 25 may thus be formed with the integral transversely extending diagonally folded connector portions 10 at or adjacent each end of the buffer and preferably extending to the rear of these buffer front members. The other transversely or vertically separated front strip members 26, 28 are thus strongly and rigidly connected in vertically aligned position, if desired, with the other or upper front strip and these lower front strips may overlap each other between the strip ends 27, 29 so as to form a double strength member between the clamps or connecting devices 30 of any suitable construction which may connect these buffer front impact receiving portions to the supporting member or device 21 of any suitable character which preferably has the front connecting portions 19 somewhat wider than the separation between the cooperating parts of the front strips 25, 26.

Fig. 5 shows a buffer front of this general type formed of two similar elements in which the front strips are oppositely bent or arched adjacent the center of the buffer front so as to form a still wider impact receiving member at this point. Each of these buffer front elements may have vertically extending diagonally or angularly folded connector portions 10 which may be located at each end of the buffer, if desired, and preferably arranged with their diagonally folded edges 7, 9 at substantially right angles to each other, which gives a desirable appearance to the buffer ends. One of these buffer front elements may comprise the vertically separated front strips 33, 34 connected by this type of diagonally folded integral transverse connector portion 10 and one of these front strip members such as 33 may be continued inward in the form of an upwardly arched or bent portion 31 having its end 36 overlapping the shorter end 40 of the other buffer front element. This right hand element may have its vertically separated front strip members 37, 38 rigidly joined at the buffer end by a similar angularly folded connector portion 10 and the lower connected front strip 38 may be extended inward, if desired, in the form of a downwardly arched or bent portion 32 having its end 39 more or less overlapping the end 35 of the short strip of the other buffer front element. A supporting member such as 21 of any suitable construction may have its connecting portions 19 clamped or bolted to these front elements in any desired way and the clamping devices 30 may extend more or less around these front strips and rigidly connect them to the connecting portions such as 19 of the supporting member which may be, if desired, of the type shown in Fig. 2. In the types of buffer front elements shown in Figs. 1, 4 and 5, both the upper and lower sets of front strips are supported by the connected buffer supporting member between the buffer center and ends and where this connection is within a foot or two of the buffer ends the stiffness of the front strips and connections with the buffer supporting member minimize the collision strains which have to be transmitted from one vertically separated front strip to the other through the vertically extending diagonally folded connector portions adjacent the buffer ends. These connector portions are therefore not subjected to such great strains under collision conditions and their angular or diagonal folded portions may thus, if desired, be bent more sharply so as to have a relatively shorter radius of curvature for this reason.

Another form of buffer is shown in Fig. 6 as comprising oppositely arched or bent center portions 41, 46 which are integral with the outwardly extending impact receiving portions 42, 47. Each of these elements, which may be made of spring steel strip, may be formed adjacent the buffer end with a diagonally folded vertically extending connector portion 10 joining the front strip 42 to the vertically displaced front strip or impact receiving member 43, while the front strip 47 is similarly joined to its lower front strip 48 which may curve backward to form an attaching member 49. This may be clamped or bolted to the automobile frame in any suitable way so as to support the buffer in connection with the similar attaching memebr 44 which may be integral with the other strip element. These buffer front elements may have their other ends 45, 50 overlapping the longer strip of the opposing buffer element and adjustably clamped thereto by any suitable connecting devices such as 51 which hold them in adjusted position so that they may have several inches lateral adjustment in their width across the automobile front, if desired, which is also the case with the buffer shown in Fig. 5.

Fig. 7 shows another form of buffer in which the front strips 52, 59 are arranged in superimposed overlapping position so as to be held in reenforcing cooperation by the clamps 58 adjacent the strip ends 53, 60. One of these buffer front elements which may be formed of hardened and tempered spring steel strip, if desired, may have the forwardly arched impact receiving member 52, 54 joined to the vertically displaced lower front strip 55 by a doubly folded vertically extending connector portion 10 which may be arranged behind these buffer front strips. The lower front strip 55 may be in substantial vertical alignment with the adjacent portion 54 of the upper strip and may be somewhat sharply curved back at 56 so as to form the attaching arm or member 57 to be clamped to the vehicle frame. The other front strip 59 may have its outer portion 61 similarly connected to the lower vertically aligned portion 62 of this buffer front element by the diagonally folded vertically extending connector portion 10. This lower strip 62 may be bent at 63 and rearwardly extended to form the attaching member 64 for connection with the car frame. In this type of construction as in the Fig. 6 form the upper and lower front strips are vertically separated so as not to come into contact under collision conditions and thus a great degree of resilient cushioning action may be secured. For this reason the angularly folded end connector portions 10 are subjected to considerable strains under such collision conditions and should be more gradually curved or bent around along the angular edges 7, 9 of the folds than is necessary where the collision strains are not carried to such a large extent through these diagonally folded connector portions from one vertically separated front strip to another.

Of course this type of integral diagonally folded connection between buffer strip elements may be used to support transversely separated portions of the strip at any desired distance apart. If desired, a considerably wider transverse or vertical separation of the adjacent portions of the strip may be secured as shown in Figs. 8 and 9 where the horizontally extending strips 65, 66 connected through the diagonally folded vertically extending portion 67 may be separated twice the width of these buffer strips, if desired, so that with spring steel strips two to three inches wide a simple and effective connection can thus be secured holding the transversely separated strips four to eight inches apart if this extent of separation is desirable for any purpose. Fig. 9 shows a rear view of this diagonally folded integral connection and as seen, the diagonal folds may be of considerable radius of curvature so that considerable collision strains may be transmitted through these diagonally folded connections where necessary without breaking or injury. In finishing these strip elements it is usually desirable to grind and polish the laterally separated strips on their front faces covering the faces of these strip members 65, 66 shown in Fig. 8 and these faces may be nickel plated with advantage. This same polished nickel plated finish may advantageously in many cases extend around the diagonal folds or bent edges 7, 9 and include the rear face of the transversely extending connector portions 67 as shown in Fig. 9. This gives a desirable and striking appearance to the buffer element, especially where this transverse connection is used at the ends of the buffer; and the other faces of the strip element may be finished in baked enamel or other less striking finish to give appropriate contrast. Such diagonal folds may be formed in any desired way in the buffer strips which are preferably bent while hot around suitable forms in bending machines or die forged by suitable devices. For example, the strip may be heated throughout to good high bending heat and then a straight heated portion of the strip may be forced through a diagonally arranged opening in a lower die by a die having rounded rectagularly arranged edges forced down on the strip which may then be forced together with this upper die into or through a transverse bending or forming aperture in the lower die to complete the diagonal folds in the strip. The hot strip may of course be otherwise bent and formed and then in many cases the heated spring steel strip can be oil quenched and then drawn at the desired heat for giving it the temper desired. In some cases, however, a limited portion of the strip may be heated to bending heat and then bent to form the diagonal folds as above described or in any other suitable way, the strip element being subsequently bent and heat treated and tempered to the desired extent. Fig. 10 shows a more closely spaced vertically separated buffer element in which the upper and lower strip members, 68, 69, which may be vertically aligned with each other, if desired, may be spaced apart no more than an inch or so by the diagonally folded transversely extending connector portion 70 of this integral strip which may have its rectangularly arranged diagonal folds 7 and 9 formed in a generally similar way, if desired.

As shown in Fig. 11, the intermediate bent or spiral portions of the buffer front may be in the form of diagonally arranged spirals which may be flattened, if desired, so as to give relatively flat front and rear surfaces and also minimize the horizontal extent of these bends of which one or more may be used on each side of the center of the buffer. In this case the attaching member 71 may be of spring strip integral with the bent portion 72 and end loop 73, if desired, so as to support the adjacent impact receiving portion 74 of the buffer front. This may merge into the diagonally arranged spiral portions 75, 76 and 77 which may, if desired, be flattened considerably so long as the diagonal folds or bands 75, 77 are not made too sharp for strength, for which reason their inner radius or curvature should usually not be less than about one inch or one inch and a half, depending of course, on the thickness of the strip and stock used. In this way increased resilience may be given to the connected central contact portion 78 of the buffer front which may be yieldingly supported in raised vertically aligned or in advanced position if desired, with respect to the other or outer impact receiving portions of the buffer. As indicated, the other buffer strip may have the attaching member 81 and connected bent and end loop portions 82, 83 so as to support the outer front portion 84 about in line with the corresponding portion 74 adjacent the other end of the buffer. Similar diagonally folded or spiral portions 85, 86, 87 may also be formed in this strip to connect the portions 84 and 88 which may thus be located in similarly raised advanced position, so as to be connected in any suitable way with the cooperating front strip 78. The enclosing clamps or clips 80, 90 may be used for this purpose adjacent the ends 79, 89 of the front strips so as to securely connect them in adjusted position, so that they are vertically rigid and this central part of the buffer front strengthened by the overlapping reenforcement which they give to each other. As seen in Fig. 11, the two vertically displaced portions of each front element extend in opposite directions from the integral angularly folded connector portion of the buffer strip.

This double diagonally folded strip connection may be used to form other buffer elements such as buffer supporting elements to support buffer front strips or members or separate buffer wings may be formed in this way which are desirable for some purposes. Figs. 12 and 13 show a different type of construction in which two vertically separated spring steel strips or members 104, 106 are joined and rigidly held in vertically separated position by a vertically extending diagonally folded connector portion 105 of the strip which may be located on the rear face of the same. This strip may be bent around into the desired curved form and the rearwardly extending portions 103, 107 of these strip members may be bolted or connected to supporting devices of any desired type so as to connect them to the automobile. Angularly arranged attaching brackets may be bolted on one or both sides of these attaching strips and may be bolted or connected to the automobile frame members in any suitable way as by the U-bolt 97 having the nuts 98, 101 screwed down above the perforated lugs 96, 102 on these two attaching brackets, which may thus be bolted to the automobile frame member 91 adjacent the frame end 93, to which the spring 92 is connected. The attaching bracket 94 may have the angularly arranged portion 95 in engagement with the frame member and, if desired, another attaching bracket 99 may have the angular portion 100 engaging the frame member and bolts 108 may extend through these brackets and through holes or adjusting slots such as 109 in the attaching strips 103, 107, so as to securely hold the attaching strips and the connected wings or buffer members in desired position.

As shown in Figs. 14 and 15, the buffer front may be formed of one or more strips of spring steel and may have the supporting attaching members bolted or connected to the transversely extending diagonally folded connector portions of the strips. In this case a single steel strip may form the buffer front and may have its vertically separated impact receiving portions 110 and 119 securely connected and spaced apart at the desired distance by the transversely extending diagonally folded connector portions 118 which may be integral with the adjacent portions of the strip. The strip may in some cases be welded together into hoop form before being diagonally folded or preferably the folds may be made adjacent one end of the strip and then these transversely extending folded portions may be welded together or otherwise connected in a secure and rigid way so as to properly support the adjacent integral parts of the strip members. It is some times desirable to bolt or connect the buffer attaching supporting members directly to these transverse folded portions adjacent the buffer ends and as shown in Fig. 14, the supporting attaching member 116 may have the forwardly and outwardly curved portions 115 merging into the outer connecting portions 113, 114 which may be bolted back of or preferably ahead of and inside the transverse connector portions 118 of the buffer front as by the bolts 112 and nuts 117, which give a strong connection of good appearance, especially when the bolts are formed with rounded flat heads as indicated and are painted or finished so as to be of less conspicuous appearance than the adjacent front strips. These transverse diagonally folded connector portions securely connecting wide thin buffer strip members of various types, obviate the necessity of edgewise bending the strips or of preliminarily cutting or narrowing the same and thus not only cheapen the manufacturing operations, but also give decidedly better and stronger connections between these types of transversely separated spring steel strip members. In some cases, however, it may be desirable to preliminarily form a gradual or long radius edgewise bend in a wide thin strip element so that two relatively straight widely separated parallel diverging strips are joined by an edgewise bent or curved junction portion. Then such edgewise bent or otherwise formed strip elements may be folded diagonally across the strip or at a substantial angle to the strip at the point where the fold occurs and by forming two such diagonal or angular folds two wide strip members may be securely united so as to be substantially parallel adjacent the folded connection and closely spaced transversely at the desired relatively short distance apart and so as to be in transverse alignment, if desired; and thus be desirable for use as buffer front or other elements in the same general way described.

This invention has been described in connection with a number of embodiments, forms, proportions, sizes, parts, arrangements, materials, methods of construction, connection and use, to the details of which disclosure the invention is not of course to be limited, since what is claimed as new and what is desired to be secured by Letters Patent is set forth in the appended claims.

I claim:

1. The automobile buffer front formed of spring steel strip of relatively wide flat cross section and comprising a pair of laterally adjustable front elements each consisting of two vertically displaced substantially vertically aligned impact receiving front portions and integral end connections between said vertically displaced front portions and each comprising a rearwardly displaced transversely extending connector portion integral with the adjacent front portions and having diagonal folds joining said connector portion thereto and forming substantially rectangularly arranged folded edges at the ends of the buffer front, and laterally extending supporting attaching elements adapted to be connected to the automobile frame and connected to both sets of said overlapping front portions on each side of the center of the buffer front.

2. The automobile buffer front formed of spring steel strip of relatively wide flat cross section and comprising a pair of laterally adjustable front elements each consisting of two vertically displaced impact receiving front portions and integral end connections between said vertically displaced front portions and each comprising a rearwardly displaced transversely extending connector portion integral with the adjacent front portions and having diagonal folds joining said connector portion thereto at the ends of the buffer front, and laterally extending supporting attaching elements adapted to be connected to both sets of said overlapping front portions on each side of the center of the buffer front.

3. The automobile buffer front formed of spring steel strip of relatively wide flat cross section and comprising a pair of laterally adjustable front elements each consisting of two vertically displaced impact receiving front portions and integral end connections between said vertically displaced front portions and each comprising a transversely extending connector portion integral with the adjacent front portions and having diagonal folds joining said connector portion thereto at the ends of the buffer front, and laterally extending supporting attaching elements adapted to be connected to both sets of said overlapping front portions on each side of the center of the buffer front, said front portions being bent vertically apart adjacent the center of the buffer front.

4. The buffer front formed of spring steel strip of vertically wide thin cross section and comprising a pair of elements each consisting of a plurality of vertically displaced substantially vertically aligned impact receiving front portions and integral end connections between said vertically displaced front portions and each comprising a rearwardly displaced transversely extending connector portion integral with the adjacent front portions and having diagonal folds joining said connector portion thereto adjacent the ends of the buffer front, and supporting attaching elements connected to both sets of said front portions on each side of the center of the buffer front to hold said front portions in overlapping mutually reenforcing position adjacent the center of the buffer front.

5. The automobile buffer front comprising two similar buffer front elements, each having vertically separated steel strip impact receiving portions connected adjacent the ends of the buffer in substantial vertical alignment by integral transversely extending diagonally folded connector portions, spring steel strip supporting attaching members cooperating with said buffer front and clamping devices adjustably connecting said front elements together and to said supporting attaching members.

6. The automobile buffer front comprising two buffer front elements, each having vertically separated steel strip impact receiving portions connected adjacent the ends of the buffer by integral transversely extending diagonally folded connector portions, steel strip supporting attaching members cooperating with said buffer front and clamping devices connecting said front elements together and to said supporting attaching members.

7. The automobile buffer front comprising two vertically separated thin vertically wide steel strip front portions connected adjacent their ends by integral diagonally folded connector portions, a steel strip supporting device cooperating with said buffer front and detachable clamping devices connecting said front portions to said supporting device.

8. The automobile buffer front comprising two vertically separated vertically wide steel strip front portions connected adjacent their ends by integral connector portions folded obliquely across the strip, a supporting device cooperating with said buffer front and devices connecting said front portions to said supporting device.

9. The buffer front comprising two buffer front elements, each having vertically separated thin steel strip impact receiving portions connected adjacent their ends in substantial vertical alignment by integral transversely extending angularly folded connector portions having folded edges arranged substantially at right angles to each other at the buffer ends, steel strip supporting members cooperating with said buffer front and clamping devices connecting said front elements together and to said supporting attaching members.

10. The automobile buffer front element formed of wide flat spring steel strip and comprising a plurality of adjacent vertically displaced vertically aligned strip members joined by an integral diagonally folded transversely extending connector portion extending rearward from the adjacent closely spaced portions of said strip members, and a cooperating supporting member having a connector portion of steel strip considerably wider than the distance between the cooperating portions of said vertically displaced strip members and secured to the rear faces thereof.

11. The automobile buffer front element formed of wide spring steel strip and comprising a plurality of adjacent vertically displaced vertically aligned strip members joined by an integral diagonally folded transversely extending connector portion, and a cooperating supporting member having a connector portion considerably wider than the distance between the cooperating portions of said vertically displaced strip members and secured to the rear faces thereof.

GEORGE ALBERT LYON.